US009467358B2

(12) United States Patent
Pichard et al.

(10) Patent No.: US 9,467,358 B2
(45) Date of Patent: Oct. 11, 2016

(54) ALARM TRIGGERING DEVICE FOR A SECURITY SYSTEM

(75) Inventors: Laurent Pichard, Frichemesnil (FR); Stephane Dimarco, Cergy (FR); Jacques Lewiner, Saint-Cloud (FR)

(73) Assignee: FINSECUR, Nanterre (FR)

( * ) Notice: Subject to any disclaimer, the term of this patent is extended or adjusted under 35 U.S.C. 154(b) by 32 days.

(21) Appl. No.: 14/007,806

(22) PCT Filed: Mar. 29, 2012

(86) PCT No.: PCT/FR2012/000114
§ 371 (c)(1),
(2), (4) Date: Sep. 26, 2013

(87) PCT Pub. No.: WO2012/131190
PCT Pub. Date: Oct. 4, 2012

(65) Prior Publication Data
US 2014/0016480 A1 Jan. 16, 2014

(30) Foreign Application Priority Data
Mar. 31, 2011 (FR) ..................................... 11 00946

(51) Int. Cl.
*H04L 12/26* (2006.01)
*G08B 25/10* (2006.01)
*G08B 29/04* (2006.01)
*G08B 29/06* (2006.01)
*G08B 29/10* (2006.01)

(52) U.S. Cl.
CPC ............... *H04L 43/08* (2013.01); *G08B 25/10* (2013.01); *G08B 29/04* (2013.01); *G08B 29/06* (2013.01); *G08B 29/10* (2013.01)

(58) Field of Classification Search
None
See application file for complete search history.

(56) References Cited

U.S. PATENT DOCUMENTS

| | | | | | |
|---|---|---|---|---|---|
| 2,987,712 | A | * | 6/1961 | Polyzou | 340/507 |
| 3,909,722 | A | * | 9/1975 | Bennett, Jr. | 340/539.1 |
| 3,942,166 | A | * | 3/1976 | Peral et al. | 340/503 |
| 4,064,507 | A | * | 12/1977 | Schmitz | 340/384.72 |
| 4,141,007 | A | * | 2/1979 | Kavasilios et al. | 340/500 |
| 4,191,947 | A | * | 3/1980 | Bouchard et al. | 340/531 |
| 5,151,682 | A | * | 9/1992 | Marinitsch | 340/514 |
| 5,822,373 | A | * | 10/1998 | Addy | 375/259 |
| 5,936,524 | A | * | 8/1999 | Zhevelev et al. | 340/552 |

(Continued)

FOREIGN PATENT DOCUMENTS

| | | | |
|---|---|---|---|
| EP | 1 477 951 | A2 | 11/2004 |
| WO | 2005/013228 | A1 | 2/2005 |

OTHER PUBLICATIONS

International Search Report, dated Oct. 17, 2012, from corresponding PCT application.

*Primary Examiner* — Bunjob Jaroenchonwanit
(74) *Attorney, Agent, or Firm* — Younđ & Thompson

(57) ABSTRACT

An alarm triggering device (200) for a security system (10), includes an interface (210) arranged so as to connect the alarm triggering device (200) to a central monitoring station (100) of the security system (10) via a wireless connection (50); elements (220) for triggering an alarm in the case of detection of a predetermined event; supply elements (230) for enabling the power supply of the alarm triggering system from a supply source; fault detection elements (240) for detecting an operating fault of the triggering device; and signaling elements (250) for signaling, to the alarm triggering device (200), the operating fault of the alarm triggering device (200).

16 Claims, 4 Drawing Sheets

(56) References Cited

U.S. PATENT DOCUMENTS

| | | | | |
|---|---|---|---|---|
| 6,157,307 | A * | 12/2000 | Hardin | 340/604 |
| 6,346,983 | B1 * | 2/2002 | Yufa | 356/338 |
| 6,492,901 | B1 * | 12/2002 | Ridolfo | 340/506 |
| 6,624,750 | B1 * | 9/2003 | Marman et al. | 340/506 |
| 6,744,366 | B2 * | 6/2004 | How | 340/571 |
| 6,809,642 | B1 * | 10/2004 | Brenner | 340/506 |
| 7,081,815 | B2 | 7/2006 | Runyon et al. | |
| 7,239,236 | B1 | 7/2007 | Britton | |
| 7,379,997 | B2 * | 5/2008 | Ehlers et al. | 709/224 |
| 7,472,202 | B2 * | 12/2008 | Parupudi et al. | 709/246 |
| 8,284,065 | B2 * | 10/2012 | Gonzales | 340/629 |
| 8,618,942 | B1 * | 12/2013 | Billman | 340/628 |
| 2001/0002793 | A1 * | 6/2001 | Woodhead et al. | 324/654 |
| 2001/0039481 | A1 * | 11/2001 | Tremblay et al. | 702/35 |
| 2002/0049933 | A1 * | 4/2002 | Nyu | 714/43 |
| 2004/0128586 | A1 * | 7/2004 | Bahr et al. | 714/43 |
| 2005/0012629 | A1 * | 1/2005 | Shebek et al. | 340/679 |
| 2005/0013228 | A1 * | 1/2005 | Miyamoto et al. | 369/59.11 |
| 2005/0083235 | A1 * | 4/2005 | Savage et al. | 343/720 |
| 2005/0264427 | A1 * | 12/2005 | Zeng et al. | 340/635 |
| 2006/0082455 | A1 * | 4/2006 | Andres et al. | 340/539.1 |
| 2006/0082464 | A1 * | 4/2006 | Andres et al. | 340/660 |
| 2006/0267760 | A1 * | 11/2006 | Shecter | 340/539.15 |
| 2007/0152809 | A1 * | 7/2007 | Berezowski et al. | 340/531 |
| 2007/0260570 | A1 * | 11/2007 | Hinchey et al. | 706/47 |
| 2008/0094204 | A1 * | 4/2008 | Kogan et al. | 340/506 |
| 2008/0177436 | A1 * | 7/2008 | Fortson | 701/29 |
| 2009/0027229 | A1 * | 1/2009 | Fortson et al. | 340/870.07 |
| 2009/0147261 | A1 * | 6/2009 | Hawkinson et al. | 356/438 |
| 2009/0163151 | A1 | 6/2009 | Menden et al. | |
| 2009/0164813 | A1 * | 6/2009 | Tu | H04B 1/1615 713/320 |
| 2009/0199855 | A1 * | 8/2009 | Davenport | 128/204.23 |
| 2009/0212961 | A1 * | 8/2009 | McGivern | 340/628 |
| 2009/0214009 | A1 * | 8/2009 | Schuman et al. | 379/106.02 |
| 2009/0243836 | A1 | 10/2009 | McSheffrey | |
| 2010/0013491 | A1 * | 1/2010 | Hooper et al. | 324/509 |
| 2010/0097733 | A1 * | 4/2010 | E. | 361/42 |
| 2010/0171608 | A1 * | 7/2010 | Harkins et al. | 340/506 |
| 2010/0192695 | A1 | 8/2010 | McSheffrey, Jr. et al. | |
| 2010/0253531 | A1 * | 10/2010 | Qiu et al. | 340/691.3 |
| 2010/0280635 | A1 | 11/2010 | Cohn et al. | |
| 2010/0302045 | A1 * | 12/2010 | Foster | 340/577 |
| 2011/0111700 | A1 | 5/2011 | Hackett | |
| 2011/0160934 | A1 * | 6/2011 | Harata | 701/2 |
| 2012/0029762 | A1 | 2/2012 | Ubik et al. | |
| 2012/0154126 | A1 * | 6/2012 | Cohn et al. | 340/10.51 |
| 2012/0212139 | A1 * | 8/2012 | Gluzman et al. | 315/125 |
| 2012/0320955 | A1 | 12/2012 | Ueda et al. | |
| 2013/0285808 | A1 * | 10/2013 | Piccolo, III | 340/539.17 |
| 2014/0002649 | A1 * | 1/2014 | Martin et al. | 348/143 |

* cited by examiner

ALARM TRIGGERING DEVICE FOR A SECURITY SYSTEM

CROSS REFERENCE TO RELATED APPLICATIONS

This is the 35 USC 371 national stage application of PCT/FR2012/000114 filed Mar. 29, 2012, which claims priority from French Patent Application No. 1100946 filed Mar. 31, 2011, each of which is herein incorporated by reference in its entirety.

TECHNICAL FIELD OF INVENTION

The present invention relates to an alarm triggering device for a security system (fire detection, intruder detection, detection of operational malfunctions in technical facilities, etc.); and to a security system (fire detection, intruder detection, detection of operational malfunctions in technical facilities, etc.) It applies in particular to fire or intruder detection in public or private residential, industrial, commercial and leisure buildings or to the detection of operational malfunctions in technical facilities. In the following, the term "technical alarm" will be used to mean the detection of operational malfunctions in technical facilities and "predefined event" to mean a fire, intrusion or an operational malfunction in technical facilities or similar.

BACKGROUND OF THE INVENTION

Regarding fire detection, a fire detection system comprises an electronic central monitoring station and a detection network that communicates with the electronic control unit including one or more alarm triggering devices or fire detection points.

These alarm triggering devices or detection points may comprise automatic fire detectors able to sense a phenomenon representative of a fire and manual fire detectors (manual triggers), which can be operated by a person discovering a fire situation. Alarm triggering devices are in general distributed in the area or areas to be monitored and connected to the central monitoring station. The electronic control unit makes it possible to monitor the area or areas to be monitored by means of the alarm triggering devices and to broadcast an alarm when a fire is detected.

The alarm triggering devices are connected to the central monitoring station so as to allow information to be exchanged between the control unit and said alarm triggering devices, so that the control unit is kept informed of the status of each element of the detection network and, if applicable, to control them.

Fire detection systems are known in which the alarm triggering devices are connected to the control unit by means of a wireless connection. To ensure reliable and safe monitoring, a high-quality link between each alarm triggering device and the control unit is important so as to enable information exchanges. However, the quality of the link can be degraded because of a loss of electric power at the alarm triggering device or because of the presence of obstacles in the radio communication path between said alarm triggering device and the control unit, for example. This can bring about a communications failure between the two elements.

In addition, wireless communications for an alarm triggering device require a high current consumption, which can quickly exhaust the power supply.

A power supply or radio communications fault can be very dangerous when a fire breaks out, since the alarm triggering device would be unable to communicate with the central monitoring station to signal that the alarm has been triggered. Where the alarm triggering device is a manual trigger, in the case of a fault as cited above, the person operating said manual trigger would not be informed that there is an operating fault of the trigger and that consequently the alarm would not be transmitted to the fire detection system control unit.

The same drawbacks as those described above can also be found when an intrusion detection system or an operational malfunction detection system for technical facilities is under consideration.

The present invention aims to remedy all or part of the drawbacks described above.

OBJECT AND SUMMARY OF THE INVENTION

To this end, according to a first aspect, the present invention envisages an alarm triggering device for a security system comprising: an interface arranged so as to connect the alarm triggering device to a control device (also known as control unit or central monitoring station) of the security system by means of a wireless connection; triggering means to trigger an alarm if a predefined event occurs; supply means to enable the alarm triggering device to be supplied with electricity from a power supply; fault detection means to detect an operating fault in the alarm triggering device; and means to signal the operating fault in the alarm triggering device at the location of the alarm triggering device.

According to a particular embodiment, the detection means are arranged so as to detect a communications fault between the alarm triggering device and the control unit by means of the wireless connection.

In an embodiment, the detection means are arranged so as to detect a fault in the power supply to the alarm triggering device from the power source and the signaling means are arranged to signal said power supply fault.

According to an embodiment, the fault detection means are arranged so as to measure a parameter representative of the reception quality of a predefined radio verification signal coming from the predefined event detection system control unit. For example, the verification means can be arranged to measure the signal-to-noise ratio or the intensity of the radio verification signal and to compare them to a predefined threshold. Hereinafter, "intensity" will mean any parameter representative of the quality of information transmission by the radio link, such as the signal's amplitude or phase or frequency modulation, for example.

According to an embodiment, the fault detection means are arranged so as to measure a parameter representative of the quantity of power remaining in the power source.

In an embodiment, the signaling means are arranged so as to generate different signals depending on the operating fault or on the magnitude of this fault.

In an embodiment, the signaling means are arranged so as to emit a sound signal whose frequency varies depending on the operating fault or on the magnitude of this fault.

According to a particular embodiment, the signaling means are arranged so as to emit a sound signal in the form of impulses at repetition frequencies that depend on the quality of the wireless connection between the alarm triggering device and the central monitoring station or on the quantity of power remaining in the power source.

According to a particular embodiment, the signaling means are arranged so as to emit a light signal whose color varies depending on the type or magnitude of this operating fault.

According to a particular embodiment, the signaling means are arranged so as to emit a blinking light signal whose blink frequency varies depending on the type or magnitude of this operating fault.

According to a particular embodiment, the triggering means are arranged to allow a user to trigger an alarm manually if a predefined event occurs.

According to a particular embodiment, the signaling means are arranged so as to signal the operating fault when a user triggers the alarm manually or when a button for testing the alarm triggering device is pressed.

According to a particular embodiment, the triggering means are arranged to automatically detect a phenomenon representative of a predefined event.

According to a particular embodiment, the alarm triggering device is associated with means of detecting the presence of at least one person in the vicinity of the triggering device and wherein the signaling means are able to signal a visible or audible alarm when the presence of at least one person is detected. For example, the means of detecting persons may comprise a detector of infrared rays from an infrared ray emitter associated with or coming from a person.

In a particular embodiment, the alarm triggering device comprises means of signaling the operating fault to the control unit.

According to a second aspect, the present invention envisages a security system comprising at least one alarm triggering device according to the first aspect of the invention and a central monitoring station able to be connected by means of a wireless connection to said set of at least one alarm triggering device.

According to another aspect, the present invention envisages an alarm triggering device for a security system comprising: an interface arranged so as to connect the alarm triggering device to a control device (also known as control unit or central monitoring station) of the security system by means of a wireless connection; triggering means to trigger an alarm if a predefined event occurs; a supply module to enable the alarm triggering device to be supplied with electricity from a power supply source; a fault detector to detect an operating fault in the alarm triggering device; and a signaling means to signal the operating fault in the alarm triggering device at the location of the alarm triggering device.

In at least one embodiment, the detector is configured so as to detect a communications fault between the trigger and the control unit by means of the wireless connection.

BRIEF DESCRIPTION OF THE DRAWINGS

In the following, descriptions are provided for a few preferred embodiments of the invention with reference to the figures in an appendix hereto, in non-limiting fashion, of course.

DETAILED DESCRIPTION OF EMBODIMENTS

Figure 1:
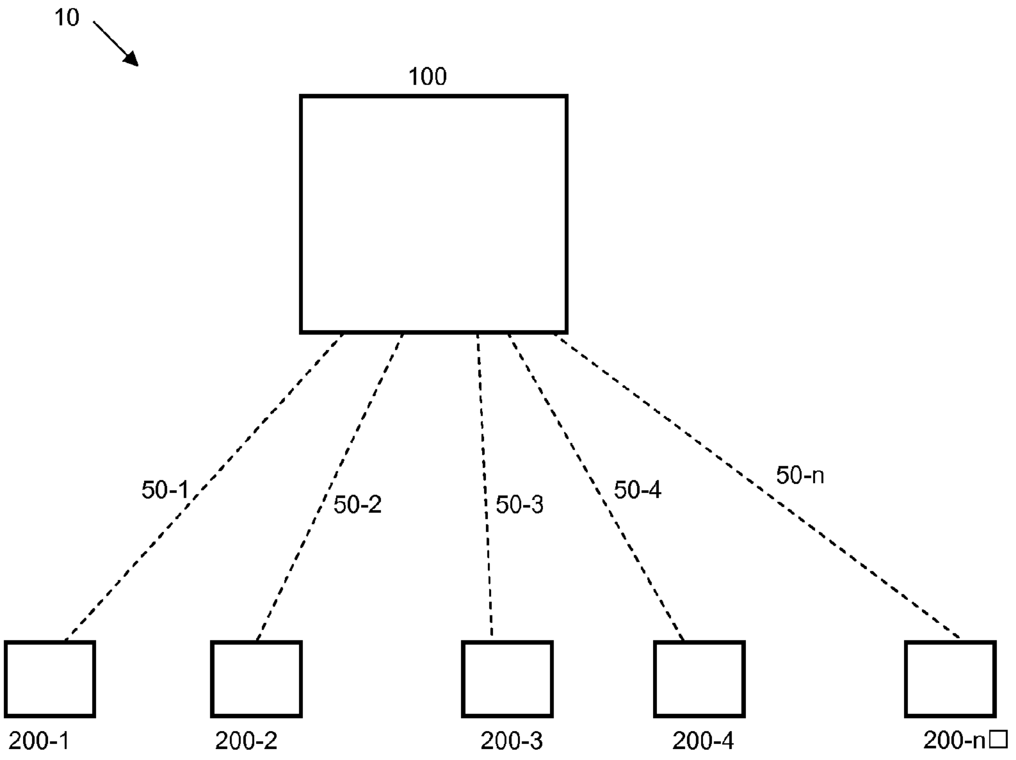
FIG. 1 represents, schematically, elements of a security system according to a first embodiment of the present invention.

A security system 10 according to a first mode of the invention is represented schematically in FIG. 1. This system comprises a central monitoring station 100, connected to several alarm triggering devices 200-1 . . . 200-*n* distributed in an area to be monitored by means of the wireless connections 50-1 . . . 50-*n*.

Figure 2A:
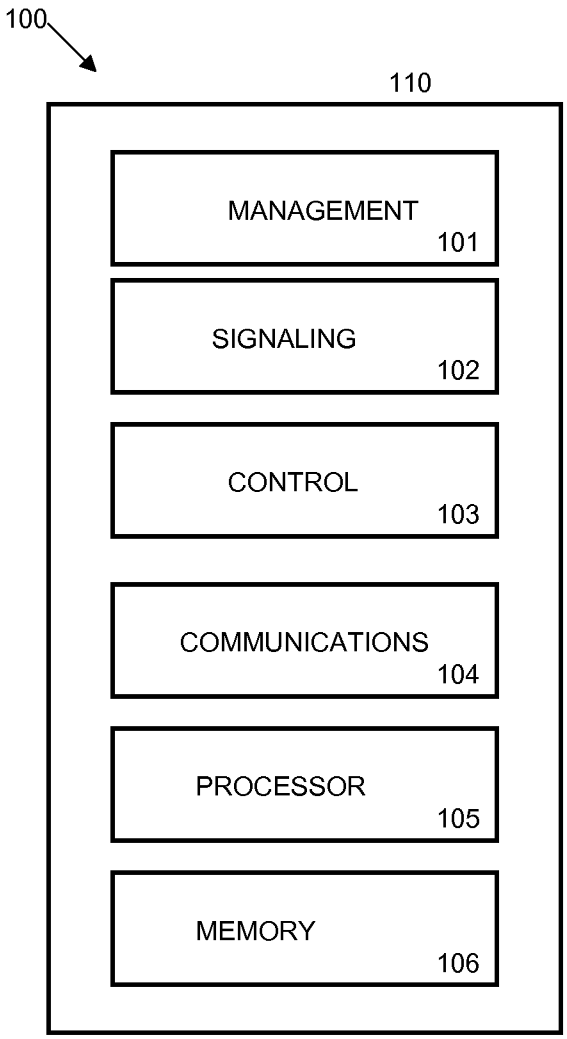
FIG. 2A represents, schematically, a central monitoring station according to a first embodiment of the invention.

In the embodiment illustrated in FIG. 2A, the central monitoring station 100 is realized with a single housing 110 that groups together a set of computerized means of management 101, and means of signaling, 102, control 103 and communications 104. The central monitoring station 100 also comprises a processor 105 to manage these means and memory 106 to store the data.

The central monitoring station 100 is configured, in a way known per se, to detect the occurrence of an alarm from any one of the alarm triggering devices 200-1 . . . 200-*n*, signal the alarm condition by visual and/or audible means and to control said alarm triggering devices 200-1 . . . 200-*n*. The communications means 104 comprise a wireless interface including a device to receive and transmit radio signals, fitted with an antenna to allow the control unit to communicate with the alarm triggering devices 200-1 . . . 200-*n* by means of the wireless connections 50-1 . . . 50-*n*.

Figure 2B:
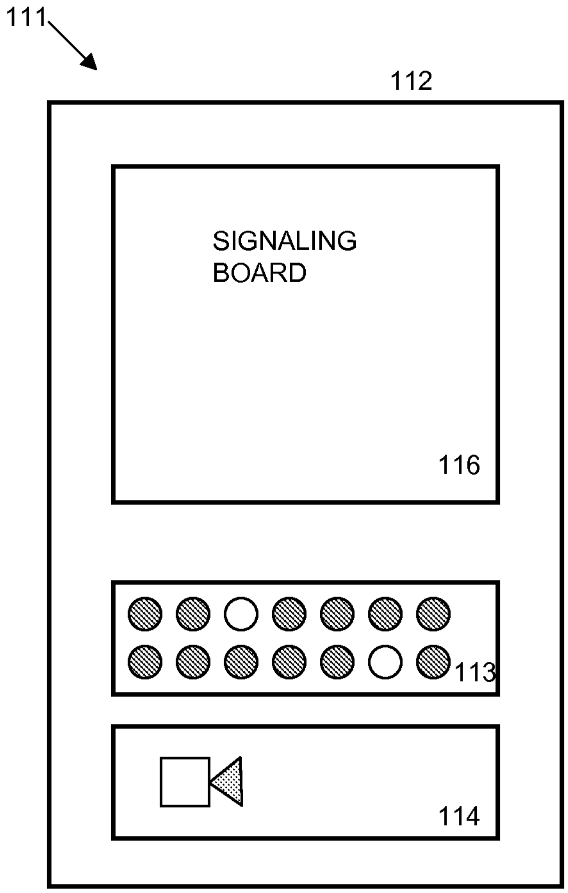
FIG. 2B represents, schematically, the front face of a central monitoring station housing according to a first embodiment of the invention.

FIG. 2B shows the front face 112 of the housing 110 comprising indicators 113, which represent, in a manner know per se, the alarm status of the alarm triggering devices of the predefined event monitoring system, e.g. a fire, a sound emitter 114 and a display screen 116. The sound emitter 114 is of a type known, for example, in fire alarms and is designed to emit an audible alarm signal.

The display screen 116 allows the control unit to display visual messages aimed at a user of the central monitoring station and/or at a member of the maintenance team for this device. In particular, the display screen 116 is designed to display an alarm indicator.

The housing 110 can be fitted, in a way known per se, with means enabling a connection towards central monitoring and control means, via a telephone line, the Internet or other means.

The alarm triggering devices 200-1 . . . 200-*n* include automatic triggers comprising predefined event detectors and manual triggers. The automatic predefined event detectors are able to sense a phenomenon representative of a predefined event, e.g. for a fire, smoke or flames. These detectors can be configured to detect a variation in a physical or chemical dimension, for example, in a non-limiting way, a temperature, a presence of smoke particles or a composition of the air and when this variation matches predefined criteria, e.g. amplitude, derivative or second derivative, said detector transmits a signal representative of a predefined event's detection to the central monitoring station 100 by means of the wireless connections 50-*n*. The automatic triggers trigger an alarm in response to the detection of a phenomenon representative of a predefined event. The manual triggers can be operated manually by a person discovering a predefined event situation, e.g. a fire. In response to the triggering, an alarm signal is transmitted to the central monitoring station 100. In some embodiments of the invention, an alarm signal can be signaled at the location of the alarm triggering device.

Figure 3:
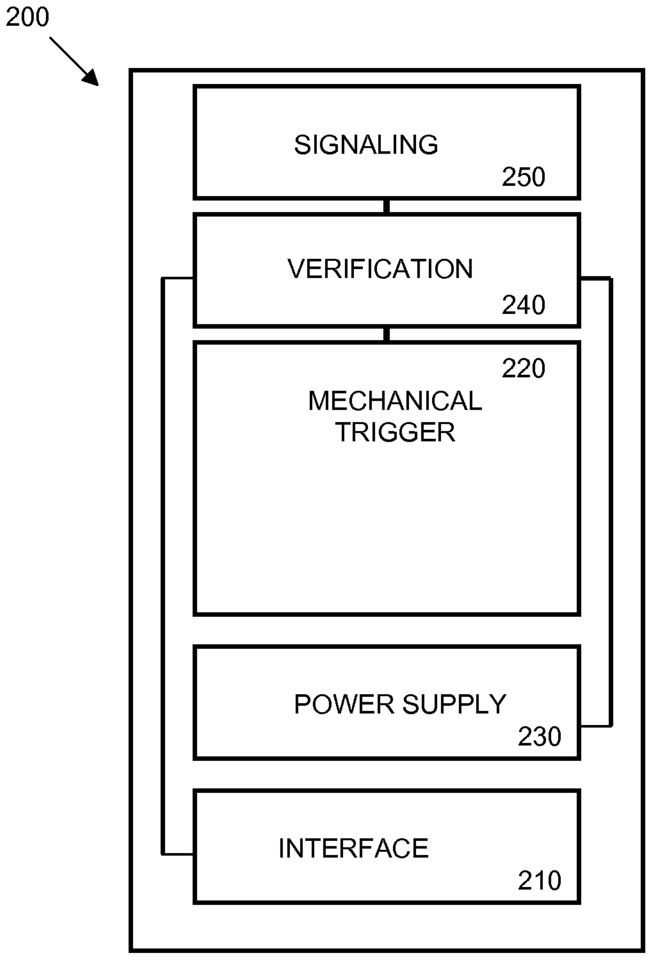
FIG. 3 represents, schematically, an alarm triggering device according to a first embodiment of the invention.

An alarm triggering device 200 for the security system, according to a first embodiment of the invention, is represented schematically in FIG. 3. The alarm triggering device in this embodiment is a manual trigger 200. This manual trigger comprises: a wireless interface 210 to connect the manual trigger 200 to the security system's central monitoring station 100 by means of the wireless connection 50; a mechanical trigger 220 such as a push-button with one or two stable balanced positions to allow a user to trigger an alarm manually in case of a predefined event, e.g. a fire; a power supply battery 230 to power the manual trigger 200; a verification processor 240 making up a fault detector 240 for detecting an operating fault of the trigger; and a signaling device 250, able to signal, at the location of the manual trigger 200, the operating fault of the manual trigger detected by the fault detector 240. The signaling device 250 can be arranged to signal, at the location of the manual trigger 200, an alarm signal when the mechanical trigger 220 is triggered in the case of an operating fault. In another embodiment, an alarm device can be provided in the manual trigger 200 to generate an alarm signal in case of an operating fault when a test button is operated.

The fault detector 240 is connected to the wireless interface 210 and to the battery 230. It is configured so as to make it possible to detect the absence of wireless communications with the central monitoring station 100 and to detect a power supply fault at the manual trigger from the battery 230. To this end, the fault detector 240 can be configured so as to measure the intensity of the radio signal received from the control unit through the wireless interface 50 and to compare it with a predefined intensity threshold. In another embodiment, the fault detector 240 can be configured so as to measure the signal-to-noise ratio of the radio signal received from the control unit through the wireless interface 50 to compare it to a predefined signal-to-noise ratio threshold. In a particular embodiment, the fault detector can be configured so as to send a test signal to the central monitoring station 100 and to wait for a response signal coming from the control unit 100 so as to verify the wireless connection 50. Failure to receive a response or receiving a response signal with low intensity may indicate a faulty wireless connection. In other embodiments, communications radio signals can be transmitted from the central monitoring station 100 towards the manual trigger on a regular basis. Failure to detect these signals or detecting signals with low intensity can trigger the signaling means 250 to generate a malfunction alarm signal.

It should be noted that the device described above also makes it possible to facilitate the installation of the triggering devices. Effectively, once the control unit has been installed, it is possible to position the triggering devices in positions such that the signaling means are not in a malfunction alarm condition. For example, if they are arranged so as to emit a sound signal in the form of impulses at repeat frequencies that get correspondingly lower as the radio link's quality decreases, then the person installing the triggering device has a directly perceptible piece of information. It would, of course, be possible to emit impulses at repeat frequencies that get correspondingly higher as the radio link's quality decreases.

In the same way, the fault detector 240 can be configured so as to measure the remaining power level in the battery 230 and compare it with a predefined threshold. A power level measurement lower than said threshold indicates a power supply operating fault.

In this embodiment, the signaling means 250 are configured so as to generate different signals depending on the operating fault. For example, the signaling means may comprise a first warning indicator dedicated to communications faults and a second warning indicator dedicated to power supply faults. In this way, the first warning indicator emitting a visible signal indicates a communications fault and the second warning indicator emitting a visible signal indicates a power supply fault. In variants, a single indicator can be configured to emit different colors depending on the operating fault or to blink at different frequencies depending on the operating fault. In other variants, a sound signal can be emitted by the signaling means to warn of the operating fault. Different sounds can be emitted depending on the operating fault detected or the emission frequency of these sounds can vary depending on the operating fault or these sounds can be emitted in the form of impulses at repetition frequencies that depend on the operating fault.

When the fault detector 240 detects a failure of communications with the central monitoring station 100 or a reduction in the intensity of the communications signal to below the reference threshold, the signaling device 250 is utilized to signal a communications fault and/or a power supply fault at the manual trigger 200. In this way, a person in the vicinity of the manual trigger 200 will be warned of the malfunction state of the manual trigger 200. This will make replacing the power supply battery 230 or repairing the manual trigger possible.

In a first variant, to avoid utilizing the signaling device when no person is in its vicinity, which could consume what little power remains in the battery, the person would be informed that the trigger is not operational in the case where he wanted to trigger a predefined event alarm and he could then trigger the alarm by means of another manual trigger or other means.

In a second variant, also to avoid utilizing the signaling device when no person is in its vicinity, which could consume what little power remains in the battery, the alarm triggering device is fitted with a presence detector and the signaling device would only be operated when people are in the vicinity of the trigger. For example, the presence detector may comprise a detector of infrared rays from an associated infrared ray emitter. The absence or reduction of infrared rays coming from the infrared ray emitter would indicate the presence of one or more persons. In a second example, the presence detector may comprise a detector of infrared rays emitted by the person or persons in the vicinity of the trigger due to their temperature. The occurrence of these infrared rays would indicate the presence of one or more persons. The presence detector can be incorporated in the alarm triggering device or can be a separate device from the alarm triggering device and associated to the alarm triggering device. In a third example, the presence detector can comprise an element sensitive to the pressure of a finger, such as a push-button, or to the touch of a finger, such as a touch key.

In some embodiments, when it is still possible to communicate with the central monitoring station, an alarm signal can also be transmitted to the central monitoring station 100 to alert it directly of the operating fault in the manual trigger 200.

In the description above, and as previously indicated, the embodiments presented described fire detection systems more specifically. The present invention also applies, of course, to other security systems.

Obviously and as is demonstrated moreover in the preceding description, the invention is in no way limited to these two modes of application and embodiments that were more specifically envisaged; on the contrary, it encompasses all the variants without in any way departing from the scope of the invention, such as it is defined by the claims.

For example, even though the embodiments were described with a manual trigger, it will be readily understood that in other embodiments of the invention, the automatic detectors of predefined events can be used.

In another variant of the invention, the radio link between a trigger and the control unit can be achieved by using intermediate triggers, which can make the radio link possible, even if the distance between the trigger that is operated and the control unit is too long to allow a direct link.

The invention claimed is:

1. An alarm triggering device for a security system, the alarm triggering device comprising:

at least one trigger to trigger an alarm when a predefined event is detected;

an interface configured to connect the alarm triggering device to a control unit of the security system by a wireless connection for transmission of the triggered alarm to the control unit;

at least one power supply battery to enable the alarm triggering device to be supplied with electricity from a power supply;

at least one fault detector to detect an operating fault in the alarm triggering device;

at least one signaling device to signal the operating fault in the alarm triggering device at the location of the alarm triggering device; and a presence detector to detect the presence of at least one person in the vicinity of the alarm triggering device, wherein the at least one fault detector is configured to detect a communications fault in the wireless connection between the alarm triggering device and the control unit by the wireless connection, and the at least one signaling device is configured to signal the operating fault at the alarm triggering device when the communications fault is detected by the at least one fault detector and the presence of the at least one person is detected by the presence detector.

2. The alarm triggering device according to claim 1, wherein the at least one fault detector is configured to detect a fault in the power supply to the alarm triggering device from the power source, and the the at least one signaling device is configured to signal said power supply fault.

3. The alarm triggering device according to claim 1, wherein the at least one fault detector is configured to measure a parameter representative of the reception quality of a predefined radio verification signal coming from the security system control unit.

4. The alarm triggering device according to claim 3, wherein the at least one fault detector is configured to measure a signal-to-noise ratio or an intensity of the predefined radio verification signal.

5. The alarm triggering device according to claim 1, wherein the at least one fault detector is configured to measure a parameter representative of the quantity of power remaining in the power source.

6. The alarm triggering device according to claim 1, wherein the at least one signaling device is configured to generate different signals depending on one or more of a type and a magnitude of the operating fault.

7. The alarm triggering device according to claim 6, wherein the at least one signaling device is configured to emit a sound signal having a frequency that varies depending on the type or on the magnitude of the operating fault.

8. The alarm triggering device according to claim 6, wherein the at least one signaling device is configured to emit a sound signal in the form of impulses at repetition frequencies that depend on the quality of the wireless connection between the alarm triggering device and the control unit or on the quantity of power remaining in the power source.

9. The alarm triggering device according to claim 6, wherein the at least one signaling device is configured to emit a blinking light signal, of which at least one of color or blink frequency varies depending on the type or magnitude of the operating fault.

10. The alarm triggering device according to claim 1, further comprising means for signaling the operating fault to the control unit.

11. The alarm triggering device according to claim 1, wherein the at least one trigger is configured to allow a user to trigger an alarm manually when a predefined event occurs.

12. The alarm triggering device according to claim 11, wherein the at least one signaling device is configured to signal the operating fault when a user manually triggers the alarm.

13. The alarm triggering device according to claim 1, wherein the at least one presence detector comprises a detector of infrared rays from an infrared ray emitter associated with or from a person.

14. The alarm triggering device according to claim 1, further comprising a manual test button triggering an operating fault detection.

15. The alarm triggering device according to claim 1, wherein the at least one trigger comprises a fire detector configured to detect a phenomenon representative of a fire, and the detection of said phenomenon being a predetermined event.

16. A security system, comprising:

at least one alarm triggering device according to claim 1; and a central monitoring station configured to be connected by a wireless connection to said at least one alarm triggering device for reception of a triggered alarm from said at least one alarm triggering device.

* * * * *